(12) United States Patent
Miller et al.

(10) Patent No.: US 11,310,965 B1
(45) Date of Patent: Apr. 26, 2022

(54) AIR FLOW METHOD AND SYSTEM FOR PLANT GROWTH AND AIR PURIFICATION

(71) Applicant: Phat Panda LLC, Spokane, WA (US)

(72) Inventors: Tyler Miller, Chattaroy, WA (US); Mojave Morelli, Spokane, WA (US)

(*) Notice: Subject to any disclaimer, the term of this patent is extended or adjusted under 35 U.S.C. 154(b) by 0 days.

(21) Appl. No.: 17/495,334

(22) Filed: Oct. 6, 2021

(51) Int. Cl.
| | | |
|---|---|---|
| A01G 9/02 | (2018.01) | |
| A01G 9/18 | (2006.01) | |
| A01G 9/24 | (2006.01) | |
| A01G 7/02 | (2006.01) | |

(52) U.S. Cl.
CPC ............... *A01G 9/246* (2013.01); *A01G 7/02* (2013.01); *A01G 9/18* (2013.01); *A01G 9/249* (2019.05)

(58) Field of Classification Search
CPC ............. A01G 9/24; A01G 9/18; A01G 9/246
See application file for complete search history.

(56) References Cited

U.S. PATENT DOCUMENTS

| | | | |
|---|---|---|---|
| 3,810,327 A | 5/1974 | Giansante | |
| 6,122,861 A | 9/2000 | Kertz | |
| 10,667,473 B2 | 6/2020 | Greenlee | |
| 2012/0054061 A1* | 3/2012 | Fok | A01G 9/24 705/26.5 |
| 2013/0118090 A1 | 5/2013 | O'Kane et al. | |
| 2015/0327447 A1 | 11/2015 | Pinchuk | |
| 2018/0343812 A1 | 12/2018 | Leo | |
| 2020/0275615 A1* | 9/2020 | Muanchart | A01G 9/18 |
| 2020/0329648 A1* | 10/2020 | McNamara | A01G 9/246 |
| 2020/0352113 A1* | 11/2020 | Canipe | A01G 25/16 |
| 2021/0137022 A1* | 5/2021 | Fuse | A01G 7/045 |

FOREIGN PATENT DOCUMENTS

| | | | |
|---|---|---|---|
| CN | 106688717 A | 7/2017 | |
| CN | 213127290 U | 5/2020 | |
| JP | 2018-64522 A | 4/2018 | |
| KR | 10-2018-0038755 A | 4/2018 | |
| KR | 10-2018-0137739 A | 12/2018 | |
| NL | 3200360 A | 9/1983 | |
| WO | WO-2019213652 A1 * | 11/2019 | G01N 33/246 |

OTHER PUBLICATIONS

The Ins & Outs of Grow Room Ventilation—Posted by: Brenda Roy.

* cited by examiner

*Primary Examiner* — Monica L Barlow
(74) *Attorney, Agent, or Firm* — Derek Fahey; The Plus IP Firm, PLLC

(57) ABSTRACT

Disclosed is an air flow method and system for plant growth and air purification within a grow room to optimize plant production and promote constant growth and quality. The grow room includes a first air mover, a second air mover, and a third air mover. The first air mover is configured to pull air upwards into a first air mover inlet and out of a first air mover outlet oriented away from the first air mover and proximate to the ceiling. The second air mover is configured to pull air into a second air mover inlet and out of the second air mover outlet, moving air towards the floor. The third air mover is to pull air into the third air mover inlet out of the third air mover outlet, moving air away from the third air mover in a horizontal direction towards an opposing wall.

20 Claims, 10 Drawing Sheets

AIR FLOW METHOD AND SYSTEM FOR PLANT GROWTH AND AIR PURIFICATION

CROSS-REFERENCE TO RELATED APPLICATIONS

Not applicable

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present method and system relates to the field of horticulture, and more specifically to the field of fluid dynamics in horticulture to optimize production and promote a consistent growth and quality of plant.

BACKGROUND

Each year more farmers are making the switch from outdoor to indoor cultivation. One of the many benefits to indoor cultivation is the ability to control the environment and weather conditions in which the plants are grown in. No longer do farmers need to rely on mother nature to determine what they can and cannot grow. Farmers can now grow a variety of highly coveted, commercial plants of equal or better quality and consistency year round. The ever growing list of commercial plants that are being grown indoors comprises a variety of herbs, fruits, or vegetables such as mint, sage, raw cocoa, flax seed, hibiscus, tomatoes, hemp, hops, and *cannabis*. The listed plants all share a common feature in that they grow under similar environmental conditions that can be duplicated artificially, which makes them a popular choice for indoor cultivation. The evolution of technology has made this transition possible, however, there is a long felt need to better control the artificial weather conditions of an indoor cultivation room.

There is widespread popularity in the family of plants known as cannabaceae. due to their rising commercial value as well as the wide array of uses stemming from the products extracted from their flowers. Hemp, for example, has become a wildly popular product ever since its federal legalization in 2018. In just a few short years the United States has become the world's third largest producer of hemp, and for good reasons. Hemp is an extraordinarily versatile plant. It can be used to make food, clothing, paper products, construction material, plastic, fuel, soaps, CBD oils, and much more. *Humulus lupulus*, better known as hops, is another widely popular product stemming from the cannabaceae family. Hop flowers are harvested and used for various purposes but is primarily used as a bittering, flavoring, and stability agent in beer. *Cannabis* products are also believed to have medicinal uses and because of this, many states allow them to be prescribed by physicians to patients with medical conditions. It is ideal for those who grow such plants to be able to replicate the quality of their previous harvests in taste, smell, yield, etc.

A longstanding issue which has plagued the growing industry for years now is the inconsistency in plant growth. The quality of a plant can vary greatly between different harvests and between individual plants within the same harvest as well. These inconsistencies can include the size of the fully grown plant, the number of buds or flowers that the plant produces, the quality of these buds or flowers such as their taste or smell, the overall lifespan of the plant, etc. One of the contributors to these inconsistencies is the air quality of the rooms these plants are stored and grown in. Air temperature and humidity can be very sporadic within a grow room. One area of a room may be cooler or drier than another, leading each of the individual plants to grow under its own set of unique conditions. This makes it difficult to replicate strands of buds or flowers from previous harvests or get a consistent growth among plants in the same harvest.

A problem with the prior art is that it uses a system of fans to circulate the air within a grow room and promotes blowing the air, including nitrogen, oxygen, and carbon dioxide ($CO_2$), directly onto the plant. However, by exposing the plants to direct air flow, albeit by wind or fan, the plants become damaged, producing decreased buds and/or flowers, and having inconsistent growth and quality throughout the grow rooms. This problem of wind damage exists whether the system is comprised of stationary fans, oscillating fans, or a combination of both.

This lack in proper air circulation is further exasperated by the placement of the HVAC system within the grow room. HVAC system are used to purify the ambient air in the room and enrich it with $CO_2$. HVAC systems typically consist of an air handler that moves air that that has been conditioned by either a cooling unit (such as a condenser) or a heating unit. This $CO_2$ enriched air is necessary for proper plant development because $CO_2$ is essential for plant growth as plants take in $CO_2$ from the air during photosynthesis. In many cases for grow rooms, HVAC return and supply vents need to be placed on the ceiling, to conserve space for additional plants, as opposed to having one vent on the floor and one on the ceiling. This orientation of return and supply vents is not optimal because the $CO_2$ enriched air may not circulate properly.

All of these lead to a multitude of problems such as large air fluctuations, pockets of dead air, stagnate hot air or cold air, etc. Without the proper air circulation plants may not produce yields large enough to generate a profit. Additionally, the yields they do produce may not be consistent in qualities such as size, smell, or taste, etc.

As a result, there exists a need for improvements over the prior art and more particularly for a more efficient way of circulating air within a grow room to optimize plant production and to promote consistent quality and growth among plants.

SUMMARY

An air flow method and system for plant growth and air purification is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, an air flow method and system for plant growth and air purification is disclosed. The system includes a grow room comprising a floor, a ceiling and at least one wall spanning between the floor and the ceiling.

The system has a first air mover comprising a first air mover inlet and a first air mover outlet disposed proximate to the ceiling and within a maximum distance from a midline of the grow room. The first air mover is configured to pull air in an upwards direction away from the grow area into the first air mover inlet. The air is then moved out of the first air mover outlet, away from the first air mover, and proximate to the ceiling. A second air mover comprising a second air mover inlet and a second air mover outlet is also disposed in the grow room proximate to the at least one wall and the ceiling. The second air mover is configured to pull air into the second air mover inlet and move the air out of the second air mover outlet, blowing the air away from the second air mover in a substantially downward direction towards the floor. A third air mover comprising a third air mover inlet and a third air mover outlet is further disposed in the grow room proximate to the at least one wall and the ceiling. The third air mover is configured to pull air into the third air mover inlet and out of the third air mover outlet, moving air away from the third air mover in a substantially horizontal direction towards an opposing wall of the at least one wall.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1:
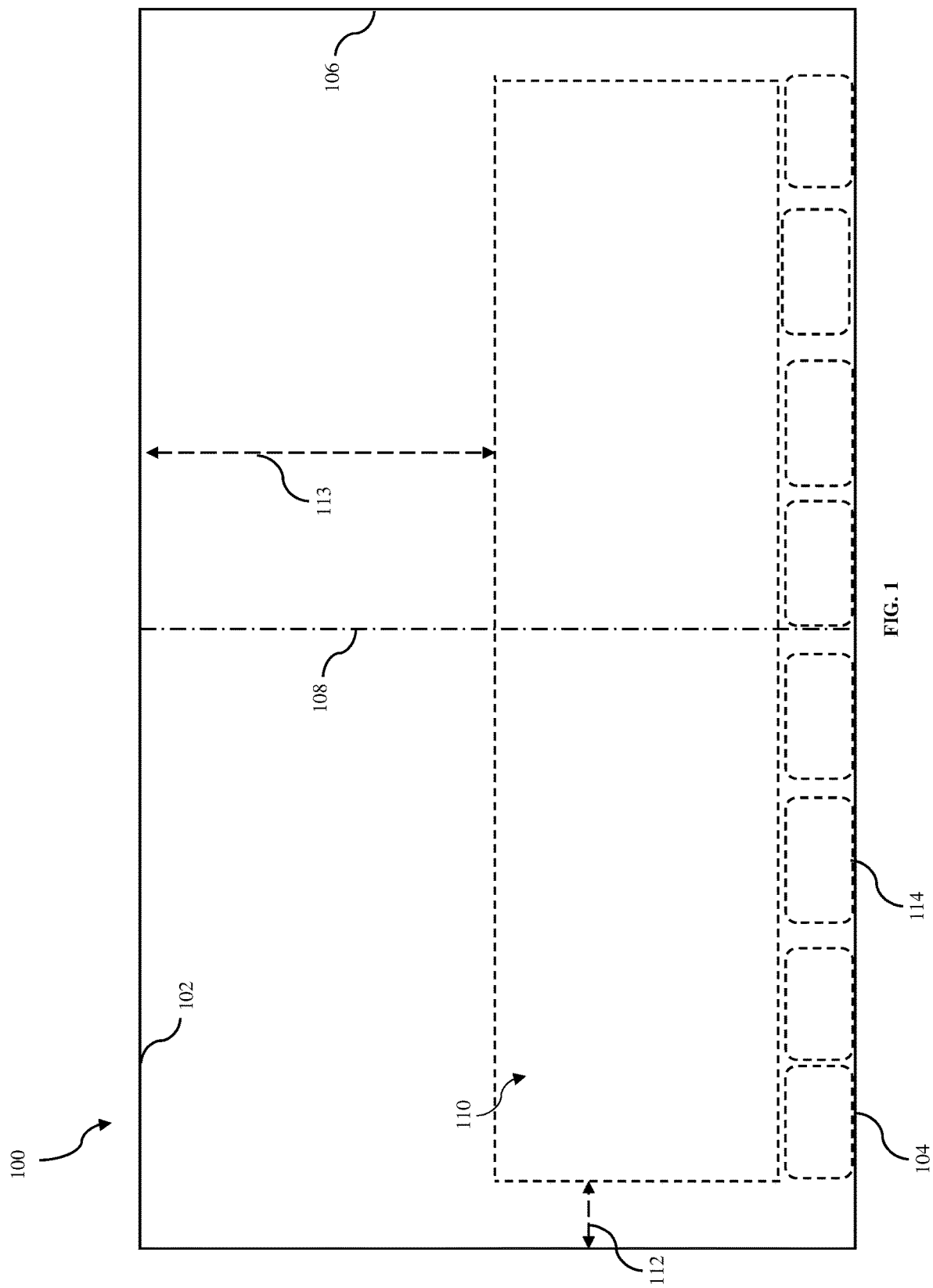
FIG. 1 is a front view of a grow room illustrating a grow area, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting, reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system and method for plant growth and air purification. The system and method define the air flow within a grow area to optimize horticulture of plants. The system improves upon the prior art by providing a flow of air across a grow room and direct limiting air flow contact to the plants from the fans or air movers. By reducing the exposure of air flow directly onto the plants, the system can promote healthier growth leading to a consistent production yield and quality. The system further includes a plurality of sensors within the room and growing area configured to monitor a plurality of environmental parameters within the grow room, including humidity, carbon dioxide, air velocity, temperature, soil moisture, air content, nutrients, etc. By monitoring a plurality of sensors, the system can maintain a constant growth environment to optimize plant yield. The system improves over the prior art by decreasing the variations of temperature, humidity, air velocity, carbon dioxide within the growing area and producing higher yields.

Figure 2:
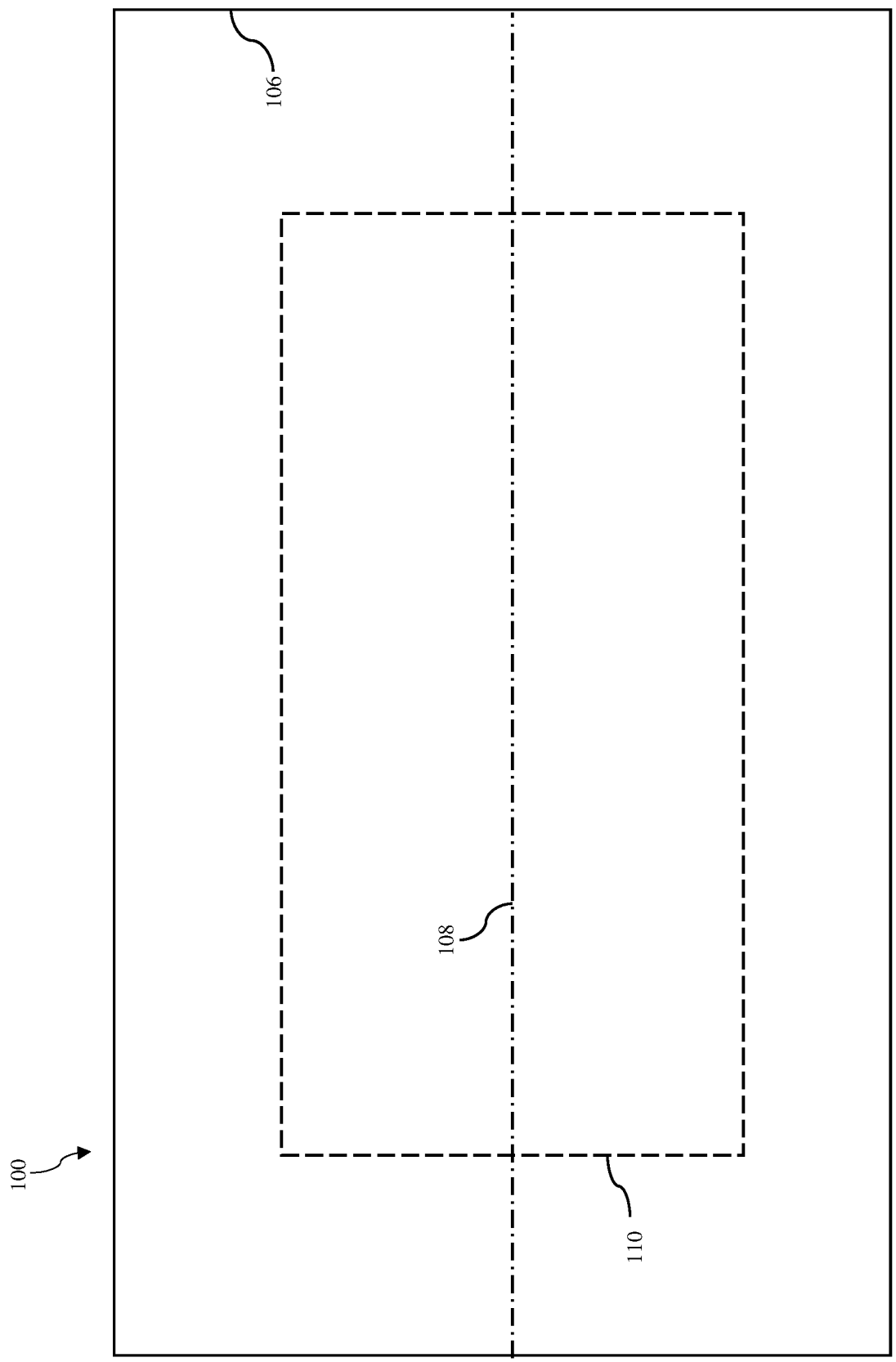
FIG. 2 is a top view of a grow room illustrating a grow area, according to an example embodiment.

Referring now to FIG. 1 and FIG. 2 a grow room is shown, according to an example embodiment. FIG. 1 is a front view of a grow room and FIG. 2 is a top view of the grow room, according to an example embodiment. The grow room 100 comprises a ceiling 102, a floor 104, and at least one wall 106 spanning between the floor and the ceiling. Other embodiments where the grow room has more than one wall are within the spirit and scope of the disclosure. For example, the grow room may include two walls opposing each other. In other embodiments, the grow room may have, for example, four walls wherein at least two opposing walls have at least one of the second air mover and third air mover disposed proximate to the respective wall. The third air mover is configured to move air horizontally across the grow room towards an opposing wall (as will be further explained below). In embodiments where the third air movers disposed on adjacent walls, the third air movers may be disposed at different, offset distances from the ceiling to prevent dead head cause by colliding air streams moving out of other third air movers. In other words, the third air moves are disposed in a staggered manner from an opposing third air mover such that dead head is prevented. Other embodiments having a plurality of walls opposing each other are within the spirit and scope of the disclosure. Embodiments having one wall may be circular grow rooms for example, whereas other embodiments having a plurality of walls are within the spirit and scope of the disclosure.

Midline 108 of the room is approximately the vertical midline of the room. The midline is to show that fan placement within the environment is symmetrical for optimization purposes. Additionally, the midline defines the placement of the at least one first air mover (as further explained in FIG. 3, for example). The growing area 110 is a portion of the grow room. The growing area may include at least one of various types of flowers or plants such as mint, sage, raw cocoa, flax seed, hibiscus, tomatoes, hemp, hops, and *cannabis*. The size of the growing area is configured to leave a space 112 between the edge of the growing area and the wall 106 spanning between the floor and the ceiling. The space 112 is configured to allow people to move about the grow room and around the growing area as needed to inspect the quality of the plants and to treat, observe, and harvest the plants as needed. The grow area is also configured such that there is a second space 113 between the grow area and the ceiling of the grow room to allow the movement of air to distribute throughout the grow room.

Below the growing area may include a support structure 114 placed between the floor and the growing area. The support structure may be a table, cart, roller or any other vertically raised platform. In one embodiment the support structure may comprise wheels for the purpose of moving plants in and out of or around the grow room. The plants that are within the growing area may be placed on the support structure. The support structure may also be partially in the growing area.

Figure 3:
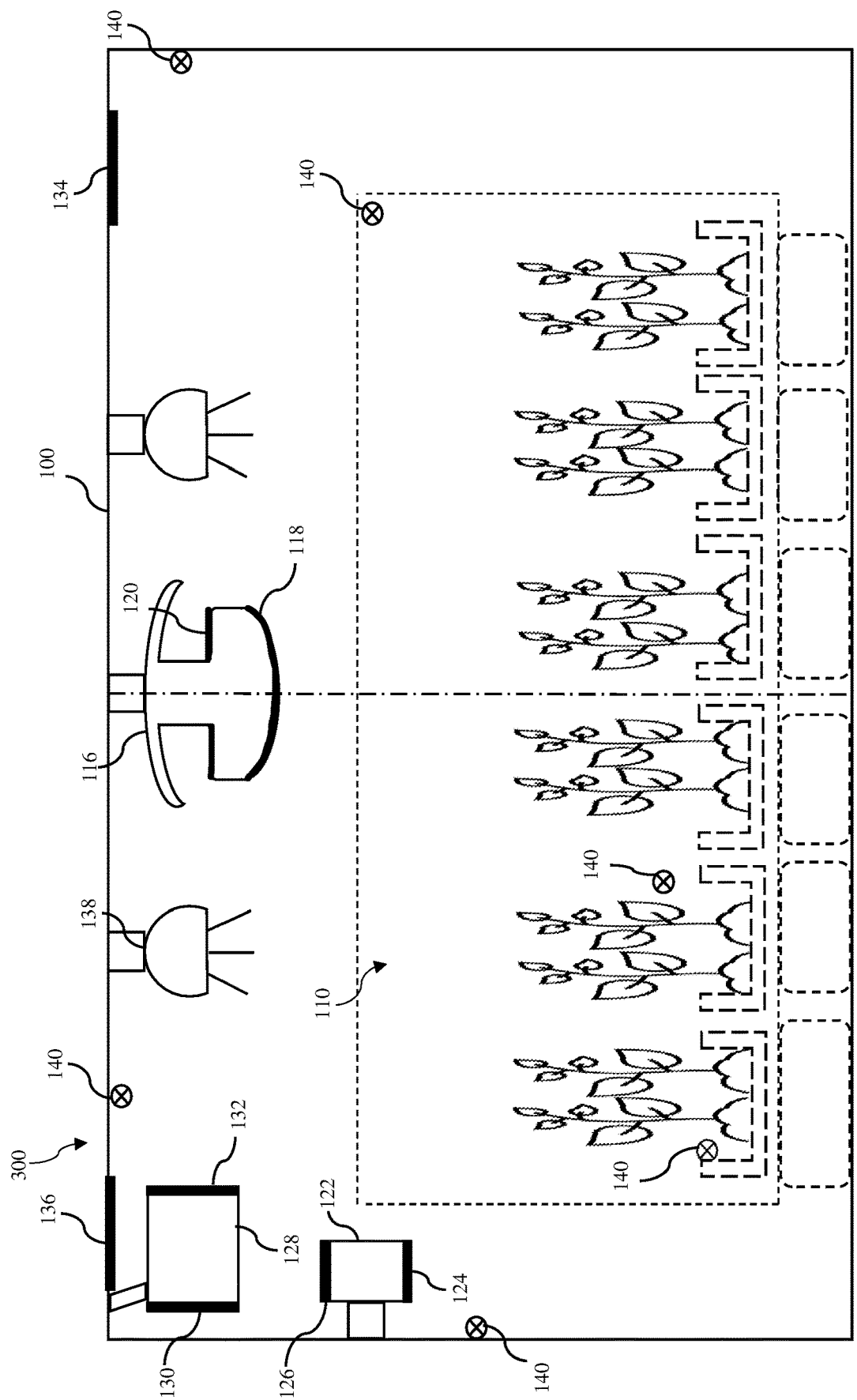
FIG. 3 is a front view of the grow room having a first air mover, a second air mover, and a third air mover, according to an example environment.
Figure 4:
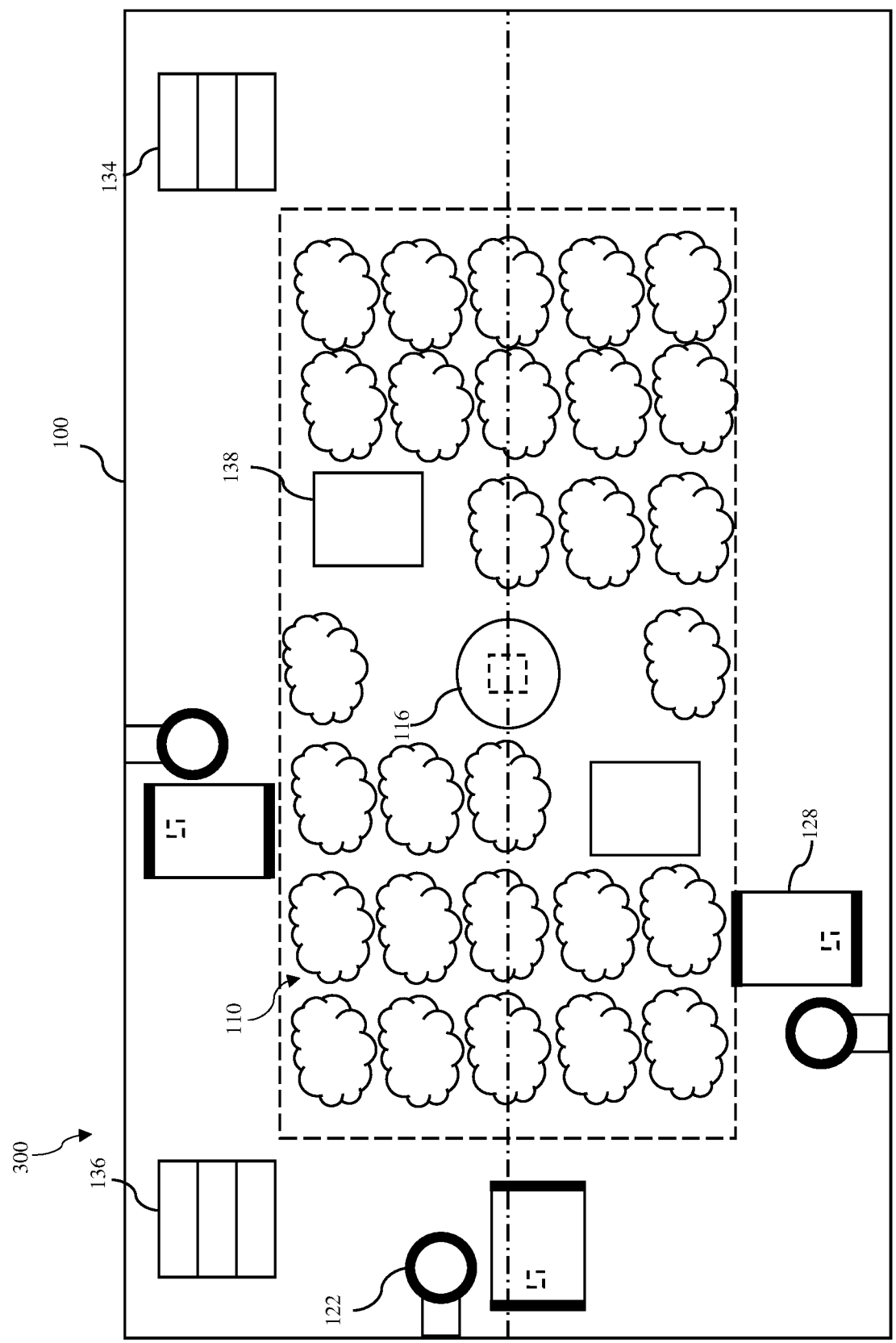
FIG. 4 is a top view of the air mover placement illustrating the orientation of the air mover, second air mover, and third air mover in the grow room, according to an example environment.

Referring now to FIG. 3 and FIG. 4 a grow room is shown, according to an example embodiment. FIG. 3 is a front view of a grow room having a first air mover, a second air mover, and a third air mover and FIG. 4 is a top view of the fan placement illustrating the orientation of the first air mover, second air mover, and third air mover in the grow room, according to an example environment.

An at least one first air mover 116 comprising a first air mover inlet 118 and a first air mover outlet 120. The at least one first air mover is disposed in the grow room within a maximum distance from the midline of the grow room and proximate to the ceiling. In an example embodiment the first air mover may be a Vostermans™ v-flow Fan™. However, other types of fans or air movers may be used and are within the spirit and scope of the present invention. The first air mover is configured to move air upward. The first air mover is positioned above the growing area and is configured such that it pulls air toward the ceiling and does not push air directly into the growing area.

At least one second air mover 122 comprising a second air mover inlet 124 and a second air mover outlet 126 is also positioned outside of the growing area 110. The at least one second air mover is disposed in the grow room proximate to the at least one wall and the ceiling. In an example embodiment the second air mover may be a can fan. However, other types of fans or air movers may be used and are within the spirit and scope of the present invention.

At least one third air mover 128 comprising a third air mover inlet 130 and a third air mover outlet 132 is also positioned outside of the growing area. The at least one third air move is disposed in the grow room proximate to the at least one wall and the ceiling. In an example embodiment the third air mover may be a Schaefer™ fan. However, other types of fans or air movers may be used and are within the spirit and scope of the present invention.

The grow room further comprises an HVAC system, in communication with the grow room. HVAC system comprises at least one HVAC supply opening 134 positioned in the grow room proximate to the ceiling, configured for supplying air into the grow room and at least one HVAC return opening 136 positioned in the grow room proximate to the ceiling, configured for moving air out of the grow room. HVAC vents are placed on the ceiling to conserve space and maximize the growing area so that more plants may be placed within the growing area. The supply vent and return vent to be positioned as far from each other as possible to avoid recycling air that has already gone through the exchange process. Different types of HVAC and filtration systems may be used in combination for use in the operational environment. In an example embodiment, the HVAC system may be include an air handler equipped with a MERV 13 rated filtration system. The system may be capable to of addressing massive latent loads caused by plant transpiration under different growing conditions with the ability to modify set points for various plant types. This system also has humidification and dehumidification settings.

At least one lighting system 138 is disposed proximate to the ceiling. The lighting system comprises at least one light positioned in the grow room proximate to the ceiling and directly above the growing area. Lighting is a key factor in promoting healthy plant growth. The lighting system acts as an efficient alternative to sunlight for plants that utilize photosynthesis. It is ideal for the lights to be placed directly above the plants to maximize their effectiveness and keep operating costs efficient. The lighting system may comprise of one or more types of lights such as high-intensity discharge (HID), fluorescent bulbs (CFL), or LED. Different lighting systems may be more suitable for certain growing conditions or at the different stages of plant development and are within the spirit and scope of the disclosure. The lighting system may include a variety of apparatus configured for emitting light and may include incandescent bulbs, halogen lights, fluorescent tubes, compact fluorescents, high intensity discharge lights, led light bulbs, LED panels, globe LED bulbs, diodes, or any combination of a device that is configured for emitting light. It is understood that other types of bulbs and light emitting devices may also be used and are within the spirit and scope of the present invention. It is also understood that the lighting system may include apparatus configured to emit heat to maintain specific temperatures within the grow area, including soil temperature and air temperature.

The system may further include at least one sensor 140 disposed within the grow room configured to monitor the environmental parameters of the system and communicate with at least one processor. The at least one sensor may include a variety of different types of sensors including air quality sensors, carbon dioxide sensors, equipment monitoring sensors, temperature sensors, humidity sensors, soil pH sensors, photoelectric sensors, gravimetric sensors, ultrasonic sensors, laser sensors, pressure sensors, and electrical sensors. Other sensors are within the spirit and scope of the disclosure. The sensors may be configured to monitor a plurality of environmental parameters which may include at least one of the temperature of the grow room, the humidity of the grow room, carbon-dioxide levels within the air, plant temperature and heat exposure, soil quality including moisture and nutrient content, and relative room temperature, humidity, and air flow within the grow area. Other environmental parameters relative to horticulture and the cultivation of plant yield are within the spirt and scope of the disclosure.

The sensors may be disposed within the grow area proximate to at least one of the first air mover, second air mover, HVAC air return, HVAC air supply, and lighting system. The sensors may also be disposed anywhere within the grow area configured to monitor the growing and environmental conditions of the plants. The sensors may be configured such that data from the sensors may aggregated to provide an average of a particular parameter within the growing area. For example, sensors positioned a multiple positions within the area that are configured to sense the temperature (or other parameters such as air velocity, relative humidity, carbon dioxide levels) may be used to provide an average of the parameter within the growing area.

Figure 5:
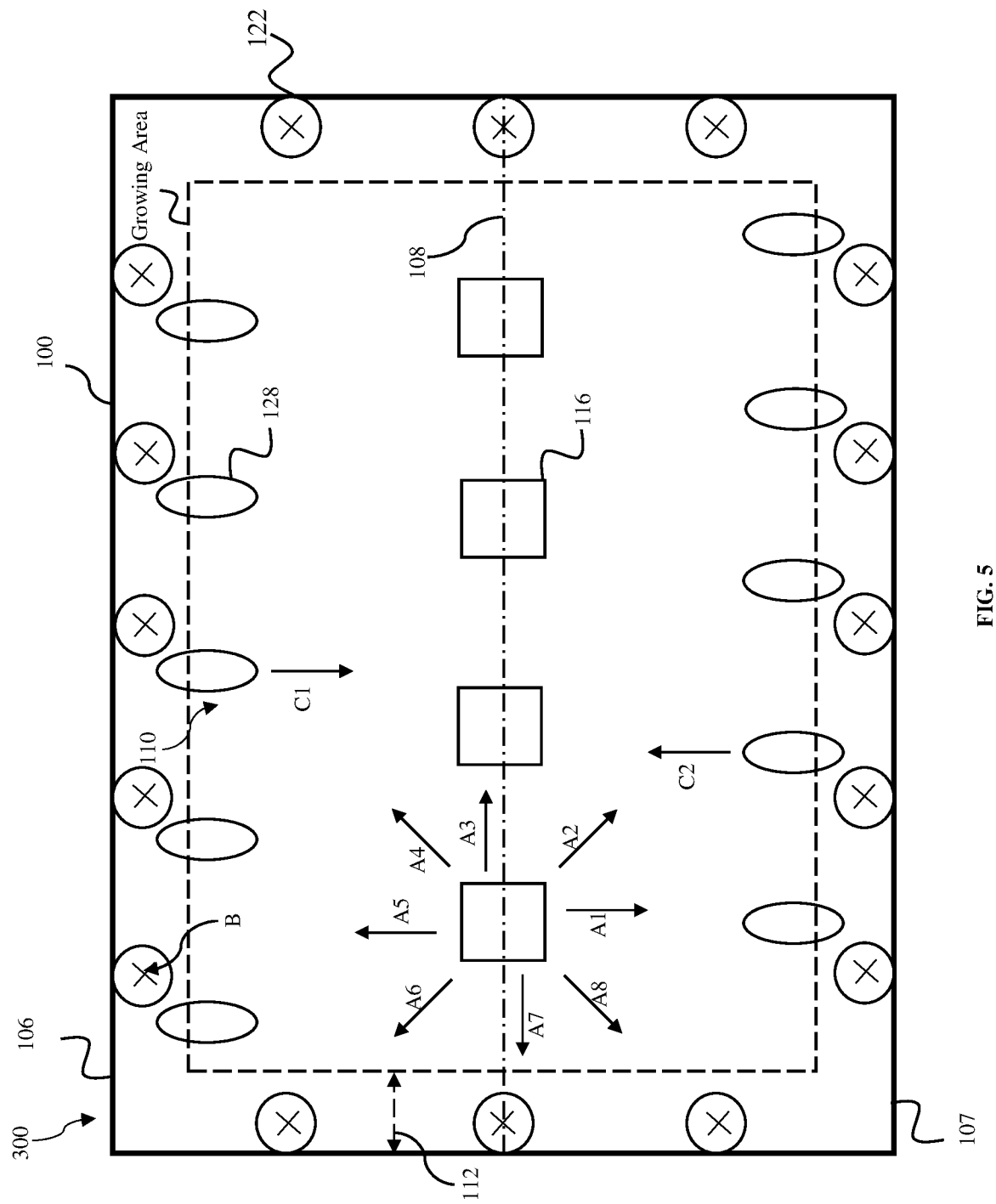
FIG. 5 is a diagram of the air flow throughout the grow room as illustrated from a top view of the grow room, according to an example environment.
Figure 6:
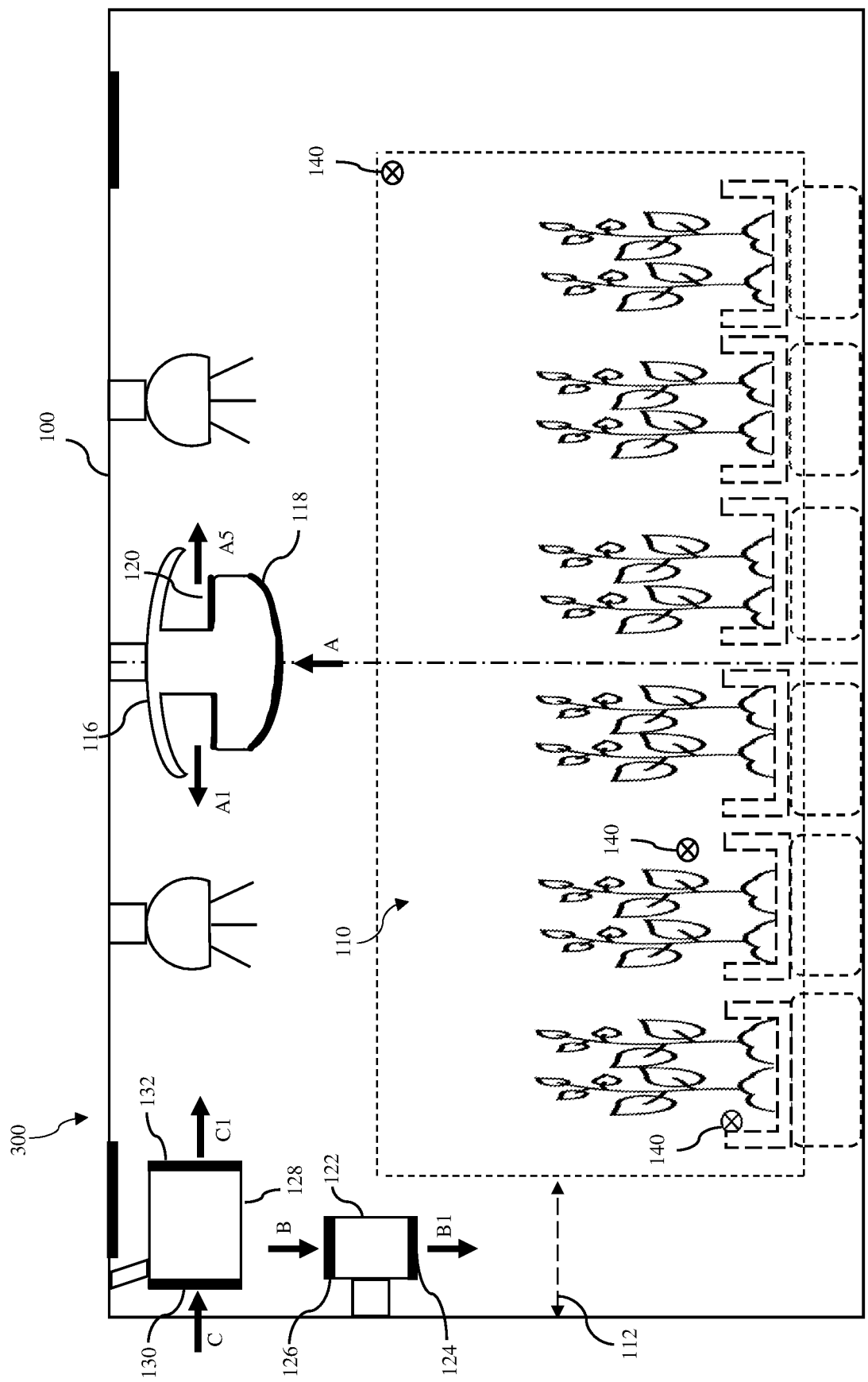
FIG. 6 is a diagram of the air flow throughout the grow room as illustrated from a front view of the grow room, according to an example environment.

Referring now to FIG. 5 and FIG. 6, a diagram of the air flow throughout the grow room is shown according to an example embodiment. FIG. 5 illustrates the movement of air within the grow room from a top view of the grow room and FIG. 6 illustrates the movement of air flow within the grow room from a side view of the grow room, according to an example environment. The grow room comprises a floor, ceiling and a plurality of walls. The grow room includes a plurality of first air movers 116 having a first air mover inlet 118 and a first air mover outlet 120. Each first air mover may include any fan or blower configured to move air upward towards the direction of the ceiling. In certain embodiments, the first air mover also includes a conical portion proximate to the first air mover outlet. The conical section is curved at an angle relative to the first air mover inlet and the ceiling such that that the air moving out of the first air mover outlet is evenly distributed throughout the grow room proximate to the ceiling. The first air mover is configured such that air is pulled in an upward direction into the first air mover inlet and moved out of the first air mover outlet away from the first air mover proximate to the ceiling. The first air mover is disposed within the grow room within a maximum distance from a midline of the grow room to ideally maintain even distribution of air flow throughout the room. The maximum distance that the first air mover may be disposed in the grow room proximate to the ceiling is no greater than a distance from the midline equal to 10% of the diameter of the grow room. Depending on the orientation of the room and the growing area, the diameter of the room may be measured by either the width, or length of the grow room. By being disposed proximate to the midline, or center of the room, the air distribution remains a constant flow from the center midline of the room outwards towards the at least one wall. As illustrated, the first air mover blows air uniformly throughout the grow room in directions A1, A2, A3, A4, A5, A6, A7, A8 which illustrates the air moving in all directions to evenly distribute throughout the grow room and away from the first air mover. The first air mover causes air to move into the first air mover inlet and out of the first air mover outlet at a minimum rate of at least 2500 cubic feet per minute. Also worth nothing is that the first air mover does not push air directly into the growing area (as better illustrated in FIG. 6).

In other embodiments, the system may include numerous first air movers positioned proximate to the midline of the grow room and proximate to the ceiling. In certain embodiments, the first air movers may be spaced from each other in relation to the first air mover's distance from the ceiling to prevent colliding air flows. A colliding air flow can disrupt the air flow pattern in the room resulting in dead head or non-moving air. Additionally, colliding air flows may force the air downward onto the plants causing harm to the plants and inconsistencies in the horticulture process, namely, the quality and yield of the plants.

The grow room further includes second air movers 122. Each second air move includes at least a second air mover inlet 124 and a second air mover outlet 126. The second air movers may include any fan or blower configured to move air downward towards the direction of the floor. The second air mover is configured such that air is pulled in a downward direction B proximate to the ceiling into the second air mover inlet and moved out of the second air mover outlet away from the second air mover. By having the second air mover disposed proximate to the at least one wall and ceiling the air distribution remains a constant flow from the ceiling to the floor. As illustrated, the second air mover blows air in direction B1, in the space 112 defined between the wall and the edge of the growing room. This configuration allows for air to be distributed in the downward direction without directly contacting the plants. In other words, the air flow from the second air movers does not push air directly towards the growing area. This prevents the plants from being damaged by the force of air distributed by the fan or blower.

The second air mover can be any fan configured to move air downwards towards the floor of the grow room. In one embodiment, the second air mover moves air out of the second air mover outlet in a substantially downward direction at a rate of at least 750 cubic feet per minute. However, the rate of the fan may change depending on the plurality of dimensions of the grow room, including the length, width, and height of the room. The second air mover can be an axial and propeller fan, a centrifugal fan, a mixed flow fan, or a cross flow fan, configured such that the air flow moves of the respective fan outlet at in a substantially downward direction. A substantially downward direction means that the air flow is approximately parallel to the at least one wall and moving towards the floor. The downward air floor should stay proximate to the wall and not move horizontally into the grow area. Air flow may be directed slightly towards the proximate at least one wall and away from the growing area because any direct air flow within the grow area onto the plants may cause damage to the plants and affect the yield. The air flow exiting the second fan is therefore at the sides of the grow room contained within the space between the growing area and the at least one wall. The quality of the air is temperate, and $CO_2$ enriched.

Additionally, the grow room further comprises a third air mover 128 comprising a third air mover inlet 130 and a third air mover outlet 132. The third air mover may include any fan or blower configured to move air in a horizontal direction towards an opposing wall. The third air mover is configured such that air is pulled in a horizontal direction proximate to the wall into the third air move inlet and moved out of the third air mover outlet away from the third air mover. By being disposed to the ceiling proximate to the wall the air distribution remains a constant flow from the at least one wall toward the opposing wall. As illustrated, the third air mover blows air in the directions of arrowed lines C1 and C2. Directions C1 and C2 are horizontal across the grow room and above the grow area. In certain embodiments, the grow room includes multiple third air movers such that the third air movers are offset on opposing walls within the grow room. By offsetting the third air movers from one another, the flow of air across the room does not collide. In embodiments, having third air movers on adjacent walls within the grow room, the third air movers may be offset at different distances from the ceiling to prevent a perpendicular collision of air flow.

The third air mover can be any fan configured to move air horizontally across a room. In one embodiment, the third air mover moves air out of the third air mover outlet in a substantially horizontal direction at a rate of at least 1000 cubic feet per minute. However, the rate of the fan may change depending on the plurality of dimensions of the grow room, including the length, width, and height of the room. The third air mover can be an axial and propeller fan, a centrifugal fan, a mixed flow fan, or a cross flow fan, configured such that the air flow moves of the respective fan outlet at in a substantially horizontal direction. A substantially horizontal direction means that the air flow is approximately parallel to the grow area such that the air flow is not directed to enter the growing area such that it may cause damage to plants within the growing area. Air flow may be directed slightly upwards towards the ceiling and away from the growing area because any direct air flow within the grow area onto the plants may cause irreparable damage to the plants and affect the yield. The air flow is therefore at the top of the room above the grow area moving towards a respective side wall of the grow room.

As illustrated in the figures, the air distribution is configured to provide the optimal circulation of air possible without directing the air moved by the first air mover, second air mover, and third air mover in a direction toward the growing area. It is preferable to avoid blowing air directly onto the growing area because doing so may damage the flowers or plants or provide an inconsistent air quality relative to the growing area. The first air mover, the second air mover, and the third air mover are positioned to prevent cooling air flow within the room to allow for optimized air distribution and circulation. The air flowing throughout the grow room is temperate and $CO_2$ enriched. Overall, the orientation of the elements of the system provides, to substantially all of the growing area, an air velocity of between 100 ft/min-500 ft/min when the system is in operations configuration. In certain embodiments, the velocity of the air flow within the growing area may be between 300-350 ft/min at any given point of the grow area. Operational configuration is defined as when the first air mover, second air mover, and third air mover are moving air throughout the grow room pursuant to this disclosure. Although the substantially all of the growing area is provided $CO_2$ enriched air at an air velocity of between 100 ft/min to 500 ft/min, the air flow of the fans do not directly force air onto the plants. The air velocity is achieved through the amalgamation of air moving throughout the grow room around the growing area. Any air velocity rate outside of a rate of 100 ft/min to 500 ft/min may cause hard to the plant and impact the quality and yield of cultivation.

Figure 7:
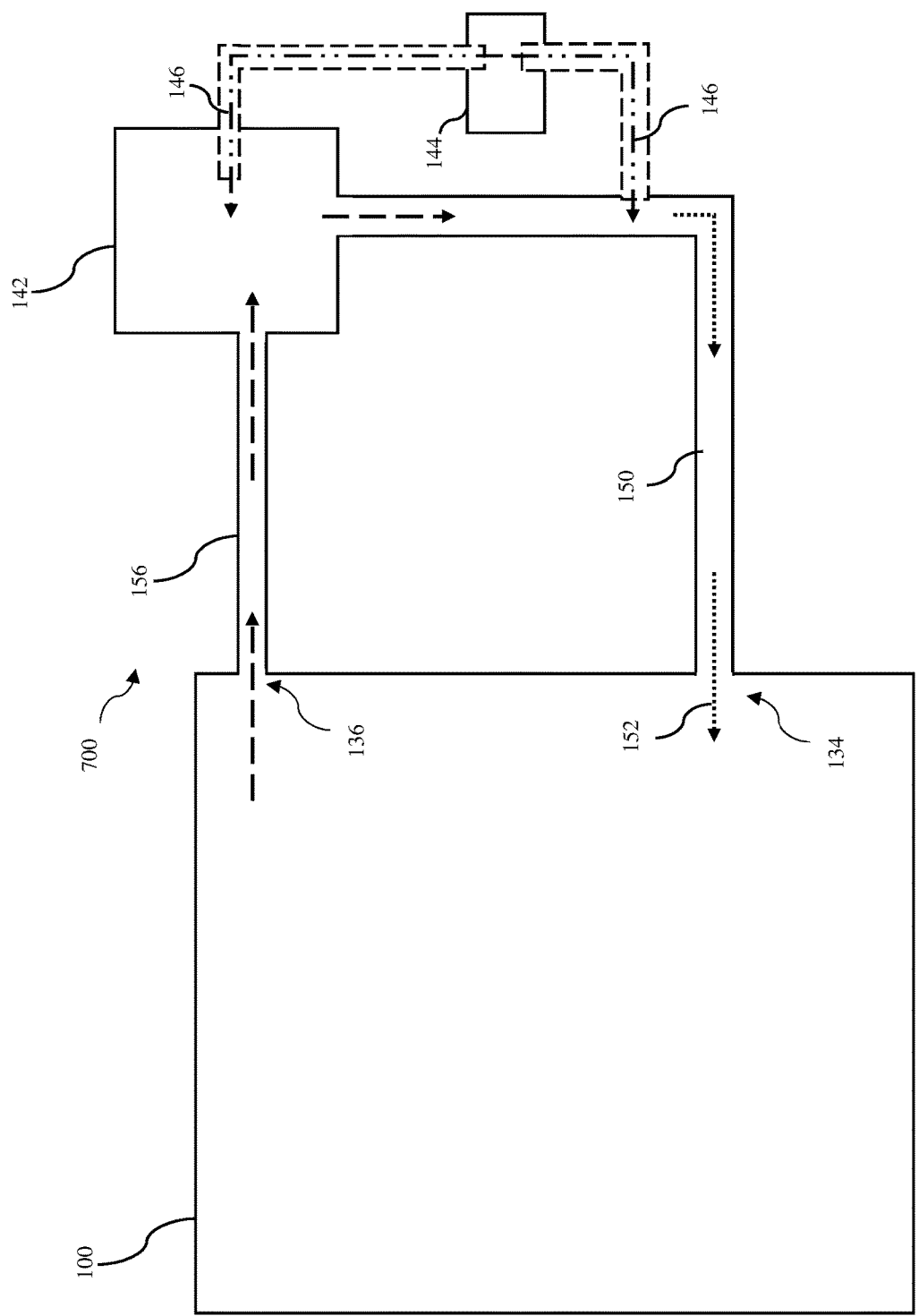
FIG. 7 is diagram illustrating some of the main components of the HVAC system for providing $CO_2$ enriched air into the grow room.

Referring now to FIG. 7, a top view diagram of the HVAC system 700 for providing $CO_2$ enriched air into the grow room is shown, according to an example embodiment. Ambient air from the grow room exits the grow room through the at least one HVAC return opening 136. The air from the grow room moves through the HVAC return duct 156 and is transferred to the air conditioner 142 where it is filtered and purified. In certain embodiments, $CO_2$ enriched air 146, which is stored in enrichment tank 144, is injected or fed into the air system at the air conditioning or air handling unit 142 such that the $CO_2$ enrichment tank is in fluid communication with the air handling unit 142. In other embodiments, the $CO_2$ enriched air 146 is injected or fed into the air supply duct 150 such that the $CO_2$ enrichment tank is in fluid communication with the air supply duct. The purified air is mixed with the $CO_2$ to create a $CO_2$ enriched air supply 152 where the purified air is enriched to provide 1200 ppm $CO_2$. However, it is understood that other levels of $CO_2$ may be provided depending on the stage of the production process. The $CO_2$ enriched air supply 152 is then transferred through the air supply duct 150 and returned to the grow room 100 by exiting through the at least one HVAC supply opening 134. The $CO_2$ enrichment tank may be in fluid communication with at least one of the air conditioning and air handling unit 142 and the air supply duct 150 using a series of interconnected pipes and ducts configured to transport $CO_2$ into the air configured to enter the grow room.

Figure 8:
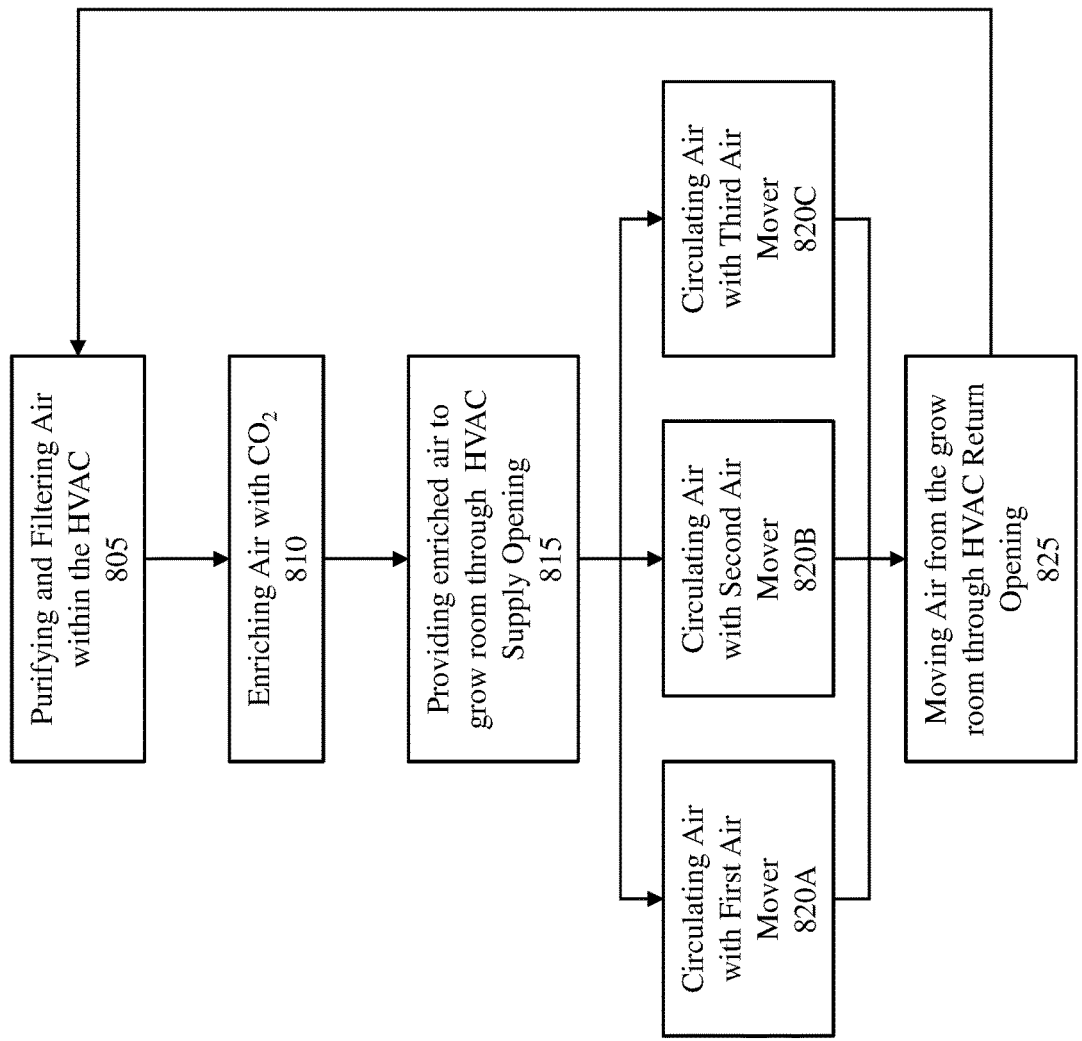
FIG. 8 is a block diagram illustrating a method of providing air flow to promote plant growth and air purification, according to an example embodiment.

Referring now to FIG. 8, a block diagram illustrating a method 800 of providing air flow to promote plant growth and air purification is shown, according to an example embodiment. At step 805, the air is purified and filtered within the HVAC system. This step may comprise filtering, treating, and cleaning the air using at least one of air filters and desensitization treatment. The air is then enriched with $CO_2$ at step 810. The $CO_2$ may be introduced into the air conditioning and air handling unit in certain embodiments and within he air supply duct system in other embodiments. The air is enriched with $CO_2$ such that the air supply provides 1200 ppm $CO_2$ to the grow room. The enriched air then travels throughout the HVAC air supply ducts and enters the grow room through the HVAC supply opening. The HVAC supply opening is generally disposed proximate to the ceiling of the grow room. Once the enriched air enters the grow room, the first air mover, the second air mover, and the third air mover each circulate the air throughout the grow room and within the growing area in step 820A, step 820B, and step 820C respectively. It is understood that, depending on at least one of the current growth stages of the plants in the growing area and the environmental parameters of the room, then each of the first air mover, second air mover, and third air mover may be operating independently. In other embodiments, it is understood that step 820A, 820B, and 820C generally operate concurrently to circulate the air flow throughout the grow room. Other permutations of circulating the air within the grow room using the first air mover, the second air mover, and the third air mover are within the spirit and scope of the disclosure. Additionally, either as the air circulates or at a predetermined time, air moves out of the grow room through the HVAC return opening at step 825. The return air is then moved to the air handling and air conditioning unit to be purified and filtered at step 805. It is understood that this method 800 is a continuous cycle and that each step of method 800 may operate concurrently with another step of method 800 to provide a continuous movement and introduction of $CO_2$ enriched air within the system. In other embodiments, the method may further include additional steps to promote plant growth consistent with the systems disclosed herein.

Figure 9:
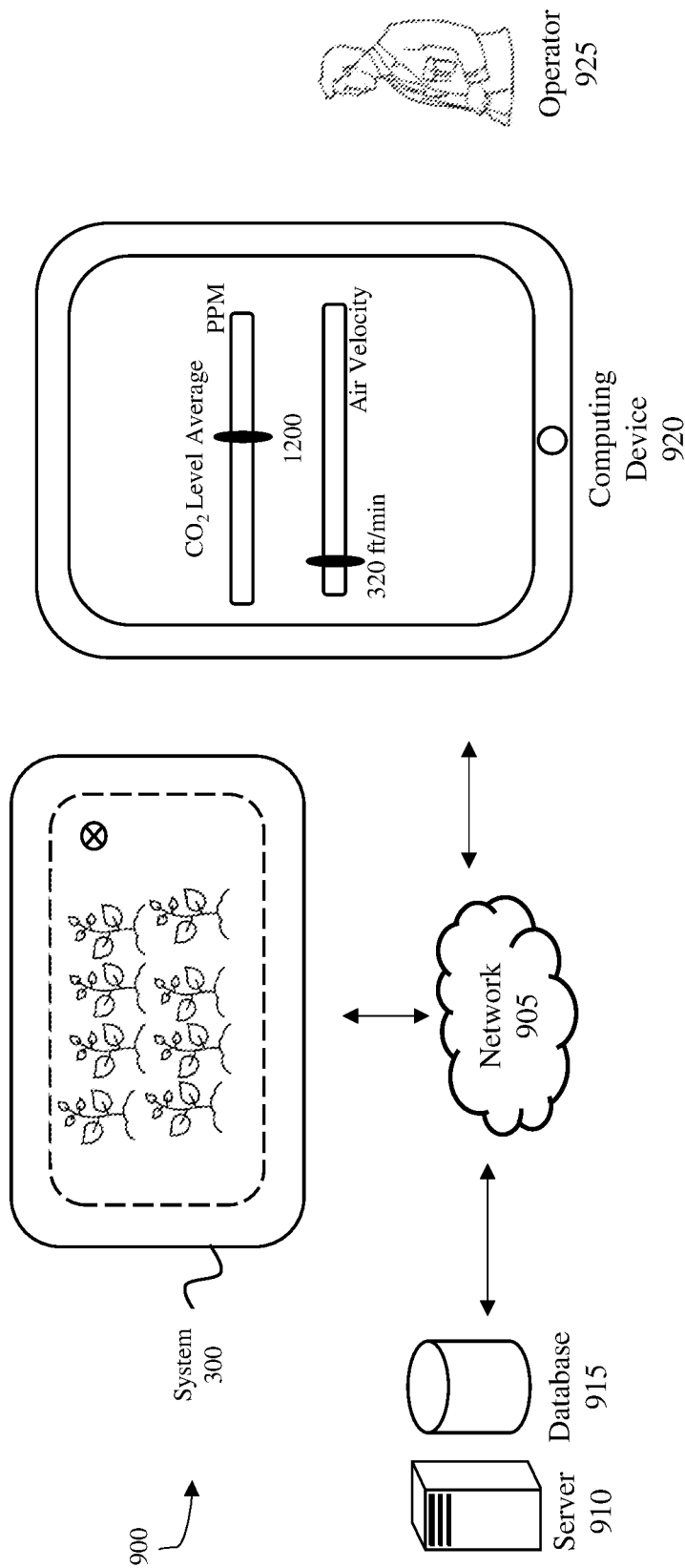
FIG. 9 is a diagram of the grow room to support the air flow system to promote plant growth and air purification, according to an example embodiment.

Referring now to FIG. 9, a diagram of the operational environment 900 to support the air flow system 300 to promote plant growth and air purification is shown, according to an example embodiment. The operational environment includes a network 905 in communication with the system 300, having the grow room and the grow area, a server 910, a database 915, and a computing device 920 controlled by operator 925. The server and database may include at least one processor configured to control the components of the system including, but not limited to, at least one of the HVAC system, first air mover, second air mover, third air mover, lighting systems, light sources, and water sources. The processor may control other components and systems necessary to maintain positive static pressure within the grow room and optimize plant yield. The sensors 140 monitor the grow room and the grow area such that the environmental parameters are maintained within predetermined environmental parameter thresholds. The system monitors the environmental parameters to maintain a positive static pressure within the grow room, namely the grow area. In certain embodiments, the environmental parameters and the respective environmental parameter thresholds are displayed on a computing device 920 such as a computer or display monitor in communication with the at least one processor. The computer device may be controlled by the operator 925. In certain embodiments, the computer device may be configured to receive an input from the operator and send a signal to the at least one processor comprising information to engage at least one of the HVAC system, first air mover, second air mover, third air mover, lighting system and lights, within the grow room. The operator can control the grow room in the operation configuration to ensure that the environmental parameters remain within the predetermined environmental parameter thresholds. Additionally, the computing device may include a display such that the parameters of the grow room, as recorded by the sensors, are graphically displayed to the operator. For example, in FIG. 8, the computing device has a display illustrating the average $CO_2$ level of the room at approximately 1200 parts per million and an average air velocity within the grow room at 320 ft/min. In other embodiments, operational status of the components of the room, such as the first air mover, second air mover, and third air mover, may be displayed on the computing device. Other embodiments displaying information about the components of the grow room as disclosed herein are within the spirit and scope of the disclosure.

In certain embodiments, the system provides to substantially all of the growing area a consistent temperature having a temperature variation of at most 1 degree Fahrenheit when the system is in the operational configuration. In certain embodiments, substantially of the growing area is maintained at approximately 80 degrees Fahrenheit. The ideal temperature and temperature range depends on the genus and species of plant, and the desired yield. The system also provides to substantially all of the growing area a consistent amount of carbon dioxide ($CO_2$) having a $CO_2$ variation of at most 300 parts per million when the system is in the operational configuration.

Additionally, the system provides to substantially all of the growing area a consistent relative humidity having a relative humidity variation of at most 5% when the system is in the operational configuration. In certain embodiments, the relative humidity of any point within the grow area may be approximately, 70% relative humidity with variation of at most 5%. The humidity level is an environmental parameter having a predetermined environmental parameter threshold dependent on the genus and species of plant and its desired yield. However, despite the varying humidity levels per plant, the system controls the humidity within the growing area within a variance of 5%. All of the plants in the growing area are ideally the same plant; however, other embodiments may include plants of like genus having similar required humidity levels.

Figure 10:
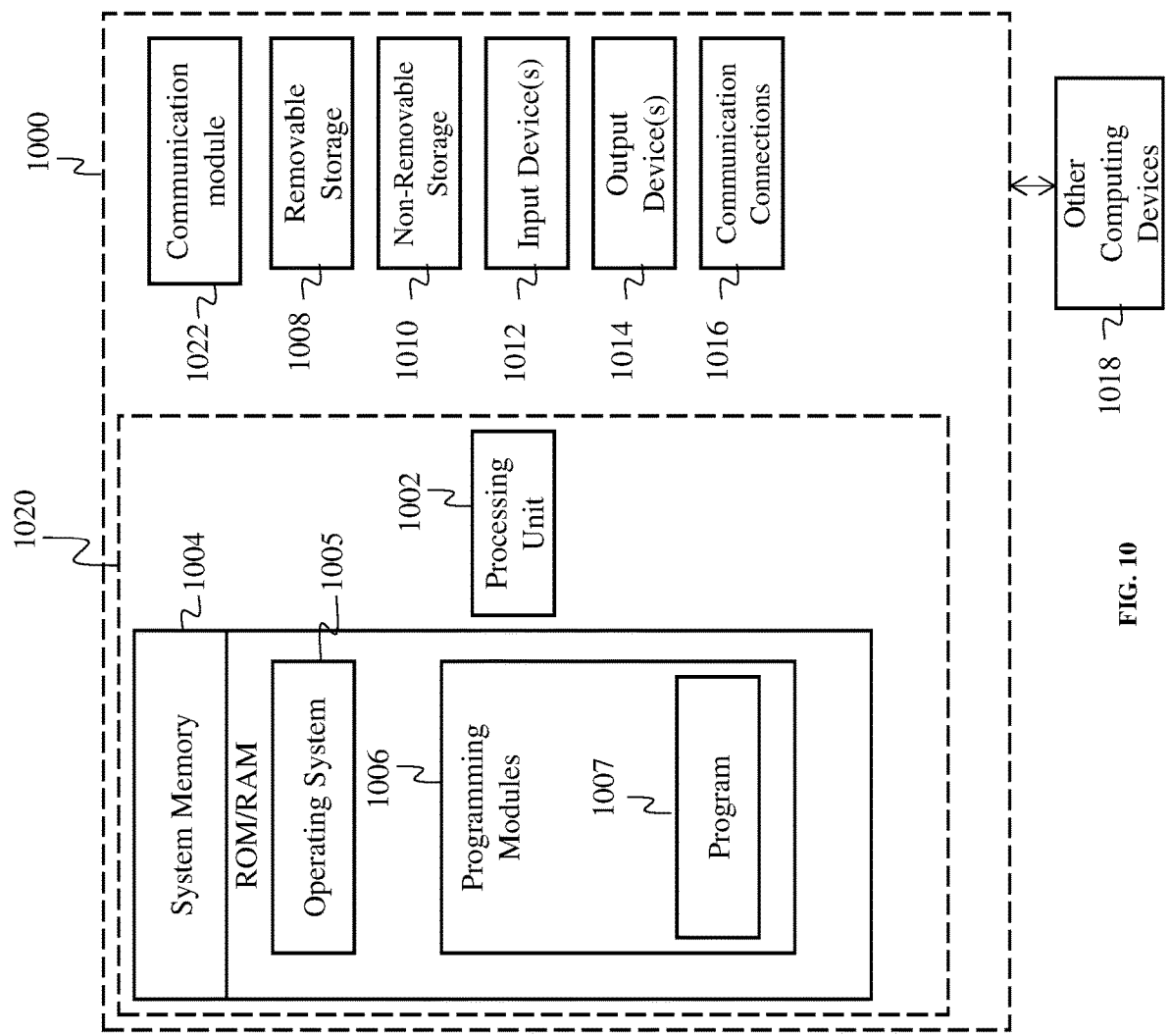
FIG. 10 illustrates a block diagram of a computer system according to exemplary embodiments of the present technology, according to an example embodiment.

Referring now to FIG. 10, a block diagram of a computer system according to exemplary embodiments of the present technology is shown, according to an example embodiment. Consistent with the embodiments described herein, the aforementioned actions performed by system 300 may be implemented in a computing device, such as the computing device 1000 of FIG. 10. Any suitable combination of hardware, software, or firmware may be used to implement the computing device 1000. The aforementioned system, device, and processors are examples and other systems, devices, and processors may comprise the aforementioned computing device. Furthermore, computing device 1000 may comprise an operating environment for system 300. Processes, data related to system 300 may operate in other environments and are not limited to computing device 1000.

A system consistent with an embodiment of the disclosure may include a plurality of computing devices, such as computing device 1000. In a basic configuration, computing device 1000 may include at least one processing unit 1002 and a system memory 1004. Depending on the configuration and type of computing device, system memory 1004 may comprise, but is not limited to, volatile (e.g., random access memory (RAM)), non-volatile (e.g., read-only memory (ROM)), flash memory, or any combination or memory. System memory 1004 may include operating system 1005, and one or more programming modules 1006. Operating system 1005, for example, may be suitable for controlling computing device 1000's operation. Furthermore, embodiments of the disclosure may be practiced in conjunction with a graphics library, other operating systems, or any other application program and is not limited to any particular application or system. This basic configuration is illustrated in FIG. 10 by those components within a dashed line 1020.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1008 and a non-removable storage 1010. Computer storage media may include volatile and nonvolatile, removable, and non-removable media implemented in any method or technology for storage of information, such as computer readable instructions, data structures, program modules, or other data. System memory 1004, removable storage 1008, and non-removable storage 1010 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 1000. Any such computer storage media may be part of computer device 1000. Computing device 1000 may also have input device(s) 1012 such as a keyboard, a mouse, a pen, a sound input device, a camera, a touch input device, etc. Output device(s) 1014 such as a display, speakers, a printer, etc. may also be included. The aforementioned devices are only examples, and other devices may be added or substituted.

Computing device 1000 may also contain a communication connection 1016 and communication module 1022 that may allow system 300 to communicate with other computing devices 1018, such as over a network in a distributed computing environment, for example, an intranet or the Internet. Communication connection 1016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media. While executing on the computing device 1000, communication module may perform processes including, for example, one of more of the steps or stages of the method 800 which may include communicating with the elements of system 300.

As stated above, a number of program modules and data files may be stored in system memory 1004, including operating system 1005. While executing on processing unit 1002, programming modules 1006 (e.g., program module 1007) may perform processes including, for example, one or more of the stages of a process. The aforementioned processes are examples, and processing unit 1002 may perform other processes. The aforementioned processes are examples, and processing unit 1002 may perform other processes and may also be configured to provide a user interface displayed associated with devices explained above. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit including discrete electronic elements, packaged or integrated electronic chips containing logic gates, a circuit utilizing a microprocessor, or on a single chip (such as a System on Chip) containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages, and/or inserting or deleting stages, without departing from the disclosure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. An air flow system for plant growth and air purification, comprising:
   a. an enclosed grow room comprising a floor, a ceiling and at least one wall spanning between the floor and the ceiling;
   b. a first air mover comprising first air mover inlet and a first air mover outlet;
      wherein the first air mover is disposed in the enclosed grow room less than a maximum distance from a midline of the enclosed grow room and proximate to the ceiling;
      wherein the first air mover is configured such that air is pulled in an upward direction into the first air mover inlet and moved out of the first air mover outlet away from the first air mover proximate to the ceiling;
   c. a second air mover comprising a second air mover inlet and a second air mover outlet disposed in the enclosed grow room proximate to the at least one wall and the ceiling;
      wherein the second air mover is configured such that air is pulled into the second air mover inlet proximate to the ceiling and out of the second air mover outlet away from the second air mover in a substantially downward direction towards the floor;
   d. a third air mover comprising a third air mover inlet and a third air mover outlet disposed in the enclosed grow room proximate to the at least one wall and the ceiling;
      wherein the third air mover is configured such that air is pulled into the third air mover inlet proximate to the ceiling and out of the third air mover outlet away from the third air mover in a substantially horizontal direction away from the at least one wall towards an opposing wall section of the at least one wall;
   e. a growing area defined within the enclosed grow room that is configured to contain at least one plant, and wherein the growing area is offset from the ceiling and the at least one wall and wherein none of the first air mover, second air mover and third air mover move air directly into the growing area.

2. The system of claim 1, wherein the first air mover causes air to move into the first air mover inlet and out of the first air mover outlet at a minimum rate of 2500 cubic feet per minute (CFM).

3. The system of claim 2, wherein the maximum distance is approximately no greater than 10% of a diameter of the enclosed grow room.

4. The system of claim 3, wherein the second air mover moves air out of the second air mover outlet substantially downward towards the floor at a rate of at least 750 CFM.

5. The system of claim 4, wherein the third air mover moves air out of the third air mover outlet substantially horizontal at a rate of 1000 CFM.

6. The system of claim 5, wherein the system further comprises an HVAC system, in communication with the enclosed grow room, wherein the HVAC system comprises at least one HVAC supply opening positioned in the enclosed grow room configured for supplying air into the enclosed grow room and at least one HVAC return opening positioned in the enclosed grow room for moving air out of the enclosed grow room.

7. The system of claim 6, wherein the at least one HVAC supply opening is positioned proximate to the ceiling.

8. The system of claim 7, wherein the at least one HVAC return opening is positioned proximate to the ceiling.

9. The system of claim 8, wherein the system provides to substantially all of the growing area an air velocity of between 100 ft/min-500 ft/min when the system is in an operational configuration.

10. The system of claim 9, wherein the HVAC system provides to substantially all of the growing area a consistent temperature having a temperature variation of at most 1 degree Fahrenheit when the system is in the operational configuration.

11. The system of claim 10, wherein the HVAC system provides to substantially all of the growing area a consistent relative humidity having a relative humidity variation of at most 5% when the system is in the operational configuration.

12. The system of claim 11, wherein the HVAC system provides to substantially all of the growing area a consistent amount of CO2 having a CO2 variation of at most 300 parts per million when the system is in the operational configuration.

13. An air flow system for plant growth and air purification, comprising:
   a. an enclosed grow room comprising a floor, a ceiling and at least one wall spanning between the floor and the ceiling;
   b. a first air mover comprising a first air mover inlet and a first air mover outlet;
      wherein the first air mover is disposed in the enclosed grow room less than a maximum distance from a midline of the enclosed grow room and proximate to the ceiling;
      wherein the first air mover is configured such that air is pulled in an upward direction into the first air mover inlet and moved out of the first air mover outlet away from the first air mover proximate to the ceiling;
   c. a plurality of second air movers wherein each of the plurality of second air movers comprises a second air mover inlet and a second air mover outlet disposed in the enclosed grow room proximate to the at least one wall and the ceiling;
      wherein each second air mover is configured such that air is pulled into the second air mover inlet proximate to the ceiling and out of the second air mover outlet away from the second air mover in a substantially downward direction towards the floor;
   d. a plurality of third air movers wherein each of the plurality of third air movers comprises a third air mover inlet and a third air mover outlet disposed in the enclosed grow room proximate to the at least one wall and the ceiling;
      wherein each of the third air movers is configured such that air is pulled into the third air mover inlet proximate to the ceiling and out of the third air mover outlet away from the third air mover in a substantially horizontal direction away from the at least one wall towards an opposing wall section of the at least one wall; and
   e. wherein the plurality of third air movers is arranged such that the third air mover outlet for each of the plurality of third air movers is offset from an opposing third air mover outlet of an opposing third air mover disposed on the opposing wall section of the at least one wall;
   f. a growing area defined within the enclosed grow room that is configured to contain at least one plant, and wherein the growing area is offset from the ceiling and the at least one wall and wherein none of the first air mover, second air mover and third air mover move air directly into the growing area.

14. The system of claim 13 wherein the system further comprises an HVAC system, in communication with the grow room, wherein the HVAC system comprises at least one HVAC supply opening positioned in the grow room proximate to the ceiling configured for supplying air into the enclosed grow room and an HVAC return opening positioned proximate to the ceiling in the grow room for moving air out of the grow room.

15. The system of claim 13, wherein the system provides to substantially all of the growing area an air velocity of between 100 ft/min-500 ft/min when the system is in an operational configuration.

16. The system of claim 14, wherein the HVAC system provides to substantially all of the growing area a consistent temperature having a variation of at most 1 degree Fahrenheit when the system is in an operational configuration.

17. The system of claim 14, the system provides to substantially all of the growing area an air velocity of between 100 ft/min-500 ft/min when the system is in an operational configuration.

18. The system of claim 14, wherein wherein the HVAC system provides to substantially all of the growing area a consistent temperature having a variation of at most 1 degree Fahrenheit when the system is in an operational configuration.

19. An air flow system for plant growth and air purification, comprising:
   a. an enclosed grow room comprising a floor, a ceiling and at least one wall spanning between the floor and the ceiling;
   b. at least one air mover comprising an air mover inlet and an air mover outlet;
      wherein the at least one air mover is disposed in the enclosed grow room less than a maximum distance from a midline of the enclosed grow room and proximate to the ceiling;
      wherein the air mover is configured such that air is pulled in an upward direction into the air mover inlet and moved out of the air mover outlet away from the air mover proximate to the ceiling;
   c. at least one second air mover comprising a second air mover inlet and a second air mover outlet disposed in the enclosed grow room proximate to the at least one wall and the ceiling;
      wherein the second air mover is configured such that air is pulled into the second air mover inlet proximate to the ceiling and out of the second air mover outlet away from the second air mover in a substantially downward direction away from the at least one wall towards the floor;
   d. at least one third air mover comprising a third air mover inlet and a third air mover outlet disposed in the enclosed grow room proximate to the at least one wall and the ceiling;
      wherein the third air mover is configured such that air is pulled into the third air mover inlet proximate to the ceiling and out of the third air mover outlet away from the third air mover in a substantially horizontal direction away from the at least one wall towards an opposing wall section of the at least one wall;

e. a growing area defined within the enclosed grow room that is configured to contain at least one plant, and wherein the growing area is offset from the ceiling and the at least one wall and wherein none of the first air mover, second air mover and third air mover move air directly into the growing area.

20. The system of claim 19, wherein the system further comprises an HVAC system, in communication with the enclosed row room, wherein the HVAC system comprises at least one HVAC supply opening positioned in the enclosed grow room proximate to the ceiling configured for supplying air into the enclosed grow room and at least one HVAC return opening positioned proximate to the ceiling in the enclosed grow room for moving air out of the enclosed grow room.

* * * * *